(12) United States Patent
Yeoh

(10) Patent No.: US 10,515,007 B2
(45) Date of Patent: Dec. 24, 2019

(54) TECHNOLOGIES FOR REMAPPING PENDING BIT ARRAY READ REQUESTS

(71) Applicant: Intel Corporation, Santa Clara, CA (US)

(72) Inventor: Siaw See Mary Yeoh, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/475,289

(22) Filed: Mar. 31, 2017

(65) Prior Publication Data

US 2018/0285255 A1    Oct. 4, 2018

(51) Int. Cl.
*G06F 3/06* (2006.01)
*G06F 12/02* (2006.01)
*G06F 13/14* (2006.01)

(52) U.S. Cl.
CPC .......... *G06F 12/0246* (2013.01); *G06F 3/061* (2013.01); *G06F 3/0659* (2013.01); *G06F 3/0683* (2013.01); *G06F 13/14* (2013.01); *G06F 2212/7201* (2013.01)

(58) Field of Classification Search
USPC ...................................................... 711/103
See application file for complete search history.

(56) References Cited

U.S. PATENT DOCUMENTS

| | | | | |
|---|---|---|---|---|
| 5,185,736 A | * | 2/1993 | Tyrrell | H04J 3/08 370/358 |
| 6,055,619 A | * | 4/2000 | North | G10H 7/002 704/270 |
| 7,047,322 B1 | * | 5/2006 | Bauman | G06F 12/0835 710/33 |
| 7,797,512 B1 | * | 9/2010 | Cheng | G06F 9/455 712/10 |
| 8,793,429 B1 | * | 7/2014 | Call | G06F 12/0246 711/103 |
| 9,047,208 B1 | * | 6/2015 | Moore | G06F 9/45533 |
| 9,417,521 B2 | * | 8/2016 | Cho | G03F 7/40 |
| 2001/0001870 A1 | * | 5/2001 | Ofek | G06F 3/0607 711/112 |
| 2004/0024973 A1 | * | 2/2004 | Chron | G06F 3/0619 711/144 |
| 2012/0203947 A1 | * | 8/2012 | Tsirkin | G06F 13/24 710/269 |

(Continued)

*Primary Examiner* — Mano Padmanabhan
*Assistant Examiner* — Jean C Edouard
(74) *Attorney, Agent, or Firm* — Barnes & Thornburg LLP

(57) ABSTRACT

Technologies for remapping pending bit array read requests include a compute device that includes a plurality of data storage devices, a request manager, and a remap manager. The request manager is to receive a request to read pending bit array (PBA) data from a main PBA mapped to multiple sub PBAs. Each sub PBA is associated with a different one of the data storage devices. The request includes attribute data indicative of an address in the main PBA from which to read the PBA data. The remap manager is to determine one or more bit addresses from the attribute data, compare the one or more bit addresses to addresses of the sub PBAs in the main PBA to determine a set of the sub PBAs to be read, and map the one or more bit addresses to the determined set of sub PBAs to be read.

25 Claims, 16 Drawing Sheets

(56) References Cited

U.S. PATENT DOCUMENTS

2014/0344492 A1* 11/2014 Patwa .................. G06F 13/24
                                                                              710/269
2015/0127922 A1* 5/2015 Camp .................. G06F 12/0246
                                                                              711/206

\* cited by examiner

900

910

The starting byte address, ByteStart[1:0] = SPLIT* ? 00: (FBE[0] = 1) ? 00 : (FBE[1:0] = 10) ? 01: (FBE[2:0] = 100) ? 10 : (FBE[3:0] = 1000) ? 11:00

The starting read address, READstart[66:0] = ADDR[63:2] & ByteStart[1:0] & 000

920

The ending split byte address, storeByteEnd[1:0] = (storeLBE[3] = 1? 11 : (storeLBE[3:2] = 01) ? 10 : (storeLBE[3:1] = 001) ? 01: (storeLBE[3:0] = 0001) ? 00: 11

The ending byte address, ByteEnd[1:0] = SPLIT* ? storeByteEnd[1:0] : (LBE[3] = 1? 11 : (LBE[3:2] = 01) ? 10 : (LBE[3:1] = 001) ? 01: (LBE[3:0] = 0001) ? 00: 11

The ending read DW address, READDWend[63:2] = split ? storedADDR[63:2] + (storeLEN[9:0] -1): ADDR[63:2] + (LEN[9:0] – 1)

The ending read bit address, READend[66:0] = READDWend[63:2] & ByteENd[1:0] & 000

1110 Read address to "sub" PBA n, SubPBAREADaddr = (READstart – PBAaddrbegin) + "sub"PBA[n]start 1120 Read address to "sub" PBA n, SubPBAREADaddr = "sub"PBA[n]start At "sub" PBA, translated ADDR[63:0] = SubPBAREADaddr[66:5] & 00B If SPLIT*, translated ADDR[63:0] = (SubPBAREADaddr[66:6] & 00B) + 1000B 1130 Read end address to "sub" PBA n, SubPBAREADend = (READend – PBAaddrbegin) + "sub"PBA[n]addrstart 1140 Read end address to "sub" PBA n, SubPBAREADend = "sub"PBA[n]addrend At "sub" PBA, translated Addrend[63:0] = SubPBAREADend[66:5] & 00

FIG. 11

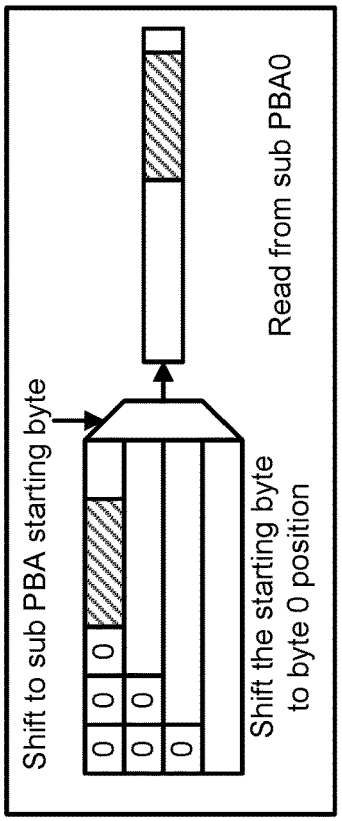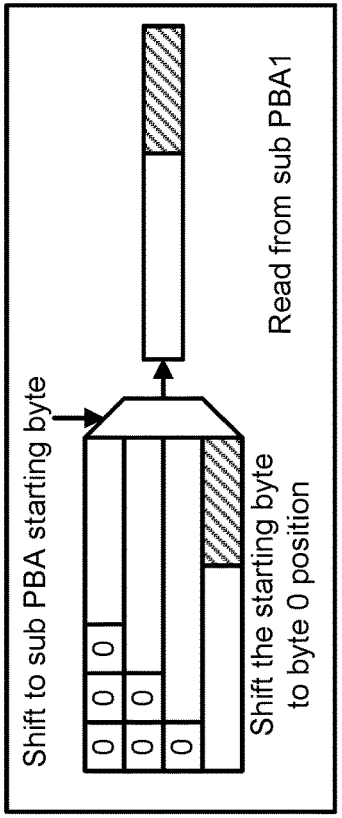
FIG. 15
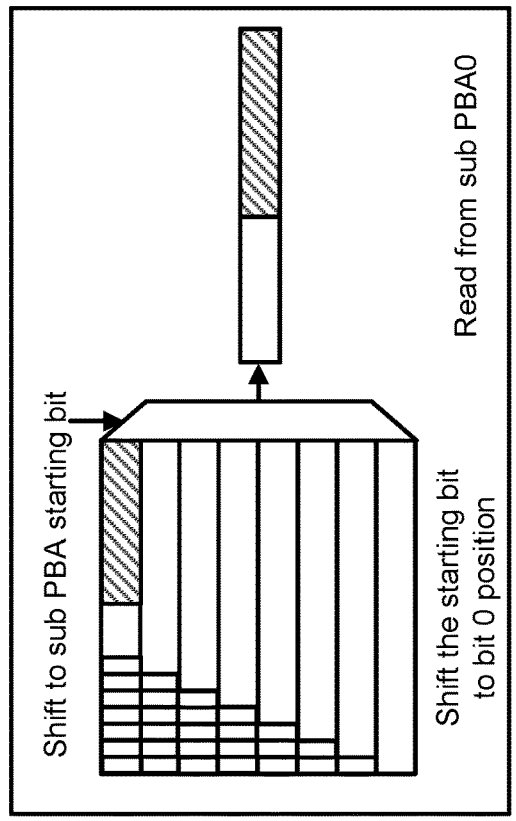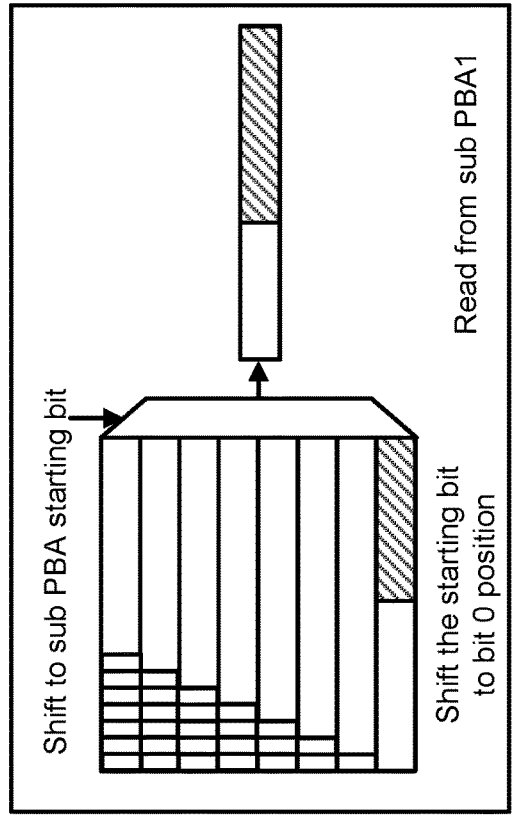
FIG. 16

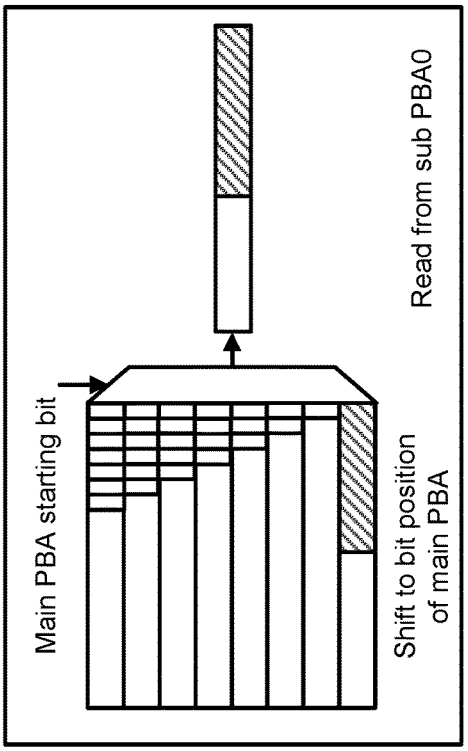
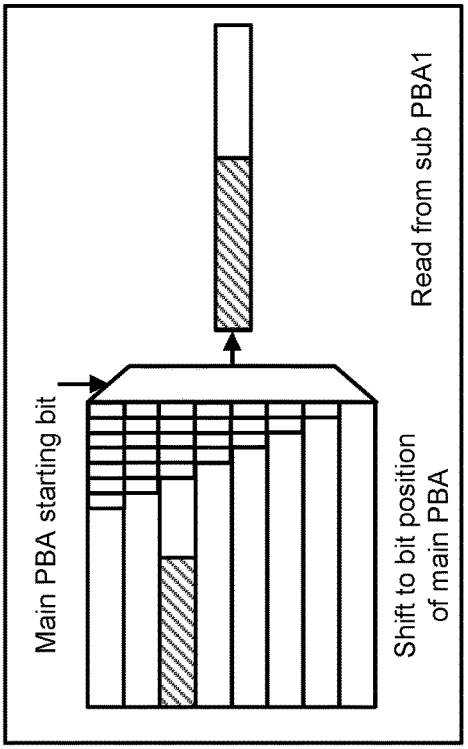
FIG. 18
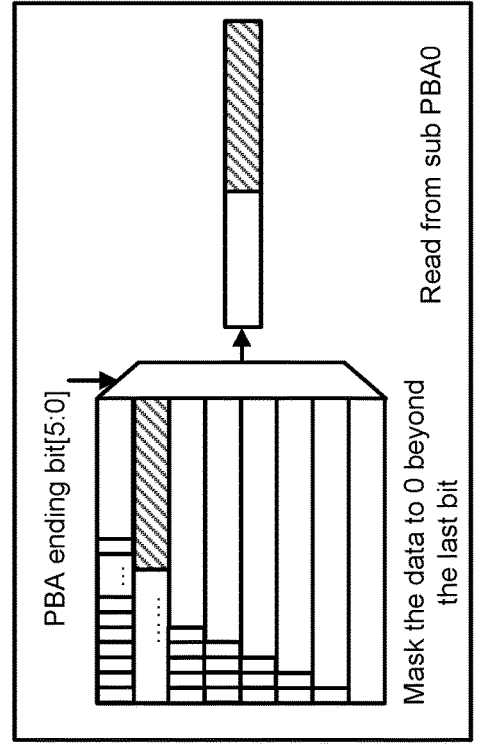
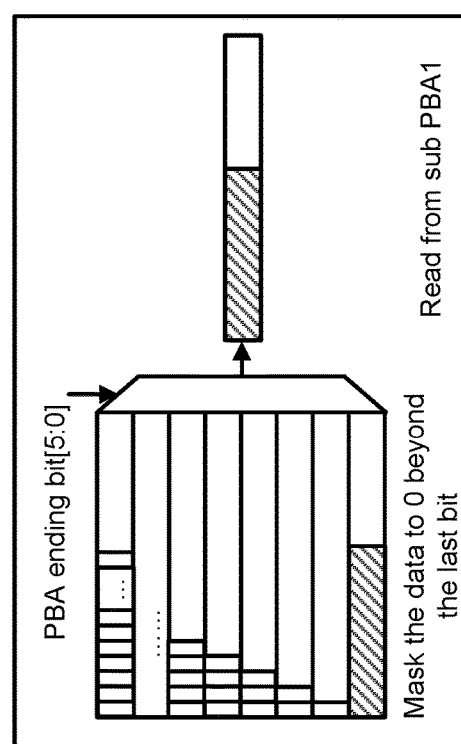
FIG. 19

TECHNOLOGIES FOR REMAPPING PENDING BIT ARRAY READ REQUESTS

BACKGROUND

Non-volatile memory remapping (NVM-r) typically supports the remapping of up to three peripheral component interconnect express (PCIe) data storage devices, such as solid state devices. If message signaled interrupts, such as in MSI-X, are supported by the data storage devices, the MSI-X table and pending bit array (PBA) structures of an advanced host controller interface (AHCI) controller (e.g., a serial advanced technology attachment (SATA) controller) connected to the data storage devices, and the MSI-X tables and pending bit array structures of the data storage devices themselves are presented to software executed by a compute device as a single "main" MSI-X table and a single "main" PBA. An MSI-X table is typically embodied as a set of entries, each referred to as a vector, indicative of a structure of a message that may be sent to the device, causing an interrupt. Each bit in the PBA is typically indicative of whether the message at the corresponding position in the MSI-X table is pending (e.g., will be sent to the corresponding device to cause an interrupt).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 9 illustrates pseudocode for determining a start bit address and an end bit address from attribute data included in a read request;

FIG. 11 is a listing of sets of pseudocode usable to determine translated starting and ending addresses for reads of pending bit array data;

FIG. 15 is a simplified block diagram of shifting sub pending bit array data by a number of bytes corresponding with a starting position of the sub pending bit array data in an address space of a main pending bit array;

FIG. 16 is a simplified block diagram of shifting sub pending bit array data by a number of bits;

FIG. 18 is a simplified block diagram of shifting sub pending bit array data to match a corresponding start bit in a main pending bit array; and FIG. 19 is a simplified block diagram of masking sub pending bit array data beyond a last bit.

DETAILED DESCRIPTION OF THE DRAWINGS

Figure 1:
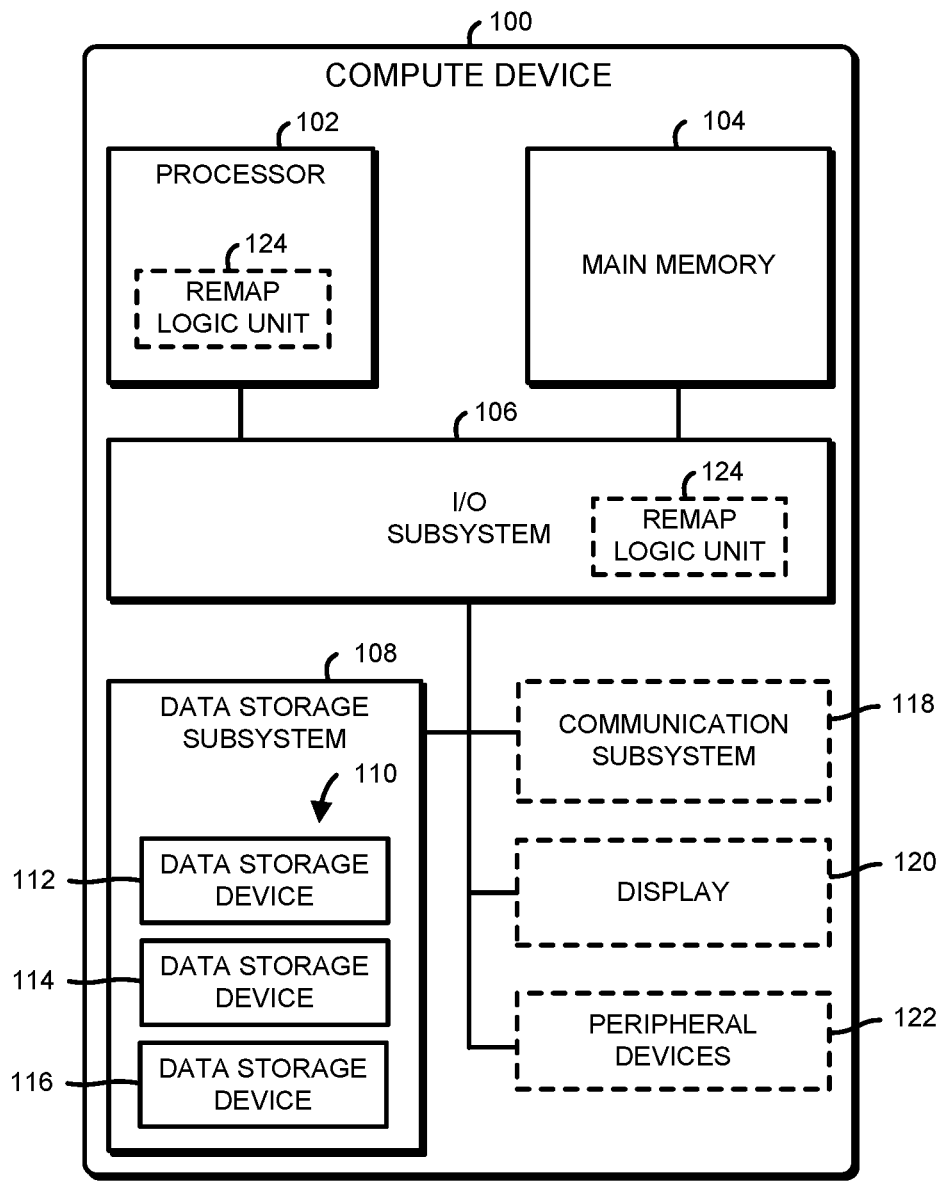
FIG. 1 is a simplified block diagram of at least one embodiment of a compute device that provides remapping of accesses to pending bit arrays.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 for remapping accesses to pending bit arrays (PBAs) may be embodied as any type of compute device capable of performing the functions described herein. For example, in some embodiments, the compute device 100 may be embodied as, without limitation, a computer, a server computer, a laptop computer, a notebook computer, a tablet computer, a smartphone, a consumer electronic device, a smart appliance, and/or any other computing device capable of performing functions to provide remapping of read requests to a main PBA to one or more sub PBAs associated with corresponding data storage device(s). As shown in FIG. 1, the illustrative compute device 100 includes a processor 102, a main memory 104, an input/output subsystem 106, and a data storage subsystem 108, which includes a set of data storage devices 110, including data storage devices 112, 114, 116. Of course, the compute device 100 may include other or additional components, such as those commonly found in a computer (e.g., communication subsystem, display, peripheral devices, etc.), in other embodiments. Additionally, in some embodiments, one or more of the illustrative components may be incorporated in, or otherwise from a portion of, another component. For example, the memory 104, or portions thereof, may be incorporated in the processor 102 in some embodiments.

In typical systems, the sizes of the PBAs for each of the data storage devices is fixed (e.g., not programmable), because providing such a feature may cause misalignments of the sub PBAs (e.g., the PBA associated with each data storage device) in the main PBA structure, potentially resulting in data access errors. However, the compute device 100, in the illustrative embodiment, enables programming the sizes of sub PBAs in a main PBA presented to software executed by the processor 102. As such, the resulting sub PBAs may not be aligned to any byte, doubleword, or quadword boundary. The compute device 100, in the illustrative embodiment, maps a read request that includes attribute data indicative of a section (e.g., an address and a length) of the main PBA to read, converts the attribute data to one or more bit addresses (e.g., a starting bit address and an ending bit address), determines, from the bit addresses, which of the sub PBAs are to be read, and issues corresponding requests to the data storage devices 110 (e.g., from one cycle router of the I/O subsystem 106 associated with a SATA controller to another cycle router of the I/O subsystem 106 associated with the data storage devices 110) to read from the corresponding PBAs. Additionally, in operation, the compute device 100 may receive the PBA data from the sub PBAs (e.g., the PBAs of the data storage devices 110 associated with the original read request) and merge the received PBA data back into the main PBA.

The processor 102 may be embodied as any type of processing device capable of performing the functions described herein. For example, the processor 102 may be embodied as a single or multi-core processor(s) having one or more processor cores, a microcontroller, or other processor or processing/controlling circuit. Similarly, the main memory 104 may be embodied as any type of volatile or non-volatile memory or data storage capable of performing the functions described herein. In operation, the main memory 104 may store various data and software used during operation of the compute device 100 such as main PBA data, sub PBA data, remap data, MSI-X table data, operating systems, applications, programs, libraries, and drivers. The main memory 104 is communicatively coupled to the processor 102 via the I/O subsystem 106. Of course, in other embodiments (e.g., those in which the processor 102 includes a memory controller), the main memory 104 may be directly communicatively coupled to the processor 102. In the illustrative embodiment, the main memory 104 is accessible through direct memory access (DMA) to enable devices, such as the data storage devices 110, read from and write to the main memory 104 without relying on the processor 102 to act as an intermediary.

The I/O subsystem 106 may be embodied as circuitry and/or components to facilitate input/output operations with the processor 102, the main memory 104, the data storage subsystem 108, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100, on a single integrated circuit chip.

The data storage subsystem 108 may be embodied as any type of devices configured for short-term or long-term storage of data such as, for example, memory devices and circuits, solid-state drives, memory cards, hard disk drives, or other data storage devices. In the illustrative embodiment, the data storage subsystem 108 includes the set of data storage devices 110 including the data storage devices 112, 114, and 116, which, in the illustrative embodiment are embodied as solid state drives capable responding to interrupts caused by memory writes to the main memory 104 in accordance with MSI-X or similar in-band interrupt generation schemes. However, in other embodiments, the data storage devices 114 may be embodied as or include any other memory devices capable of performing the functions described herein. Further, while three data storage devices 110 are shown in FIG. 1, it should be understood that, in other embodiments, the data storage subsystem 108 may include a different number of data storage devices 110. The data storage devices 110 are described in more detail with reference to FIG. 2.

The compute device 100 may additionally include a remap logic unit 124, which may be embodied as any specialized device or circuitry capable of efficiently remapping data accesses from the main PBA to the various sub PBAs of the data storage devices 110 and merging data received from the sub PBAs back into the main PBA. The remap logic unit 124 may be included in the I/O subsystem 106 and/or the processor 102.

The compute device 100 may also include a communication subsystem 118, which may be embodied as one or more devices and/or circuitry capable of enabling communications with one or more other compute devices. The communication subsystem 118 may be configured to use any suitable communication protocol to communicate with other compute devices including, for example, wireless data communication protocols, cellular communication protocols, and/or wired communication protocols.

Additionally or alternatively, the compute device 100 may include a display 120. The display 120 may be embodied as, or otherwise use, any suitable display technology including, for example, a liquid crystal display (LCD), a light emitting diode (LED) display, a cathode ray tube (CRT) display, a plasma display, and/or other display usable in a compute device. The display may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors. Additionally or alternatively, the compute device 100 may include one or more peripheral devices 122. Such peripheral devices 122 may include any type of peripheral device commonly found in a compute device such as speakers, a mouse, a keyboard, and/or other input/output devices, interface devices, and/or other peripheral devices.

Figure 2:
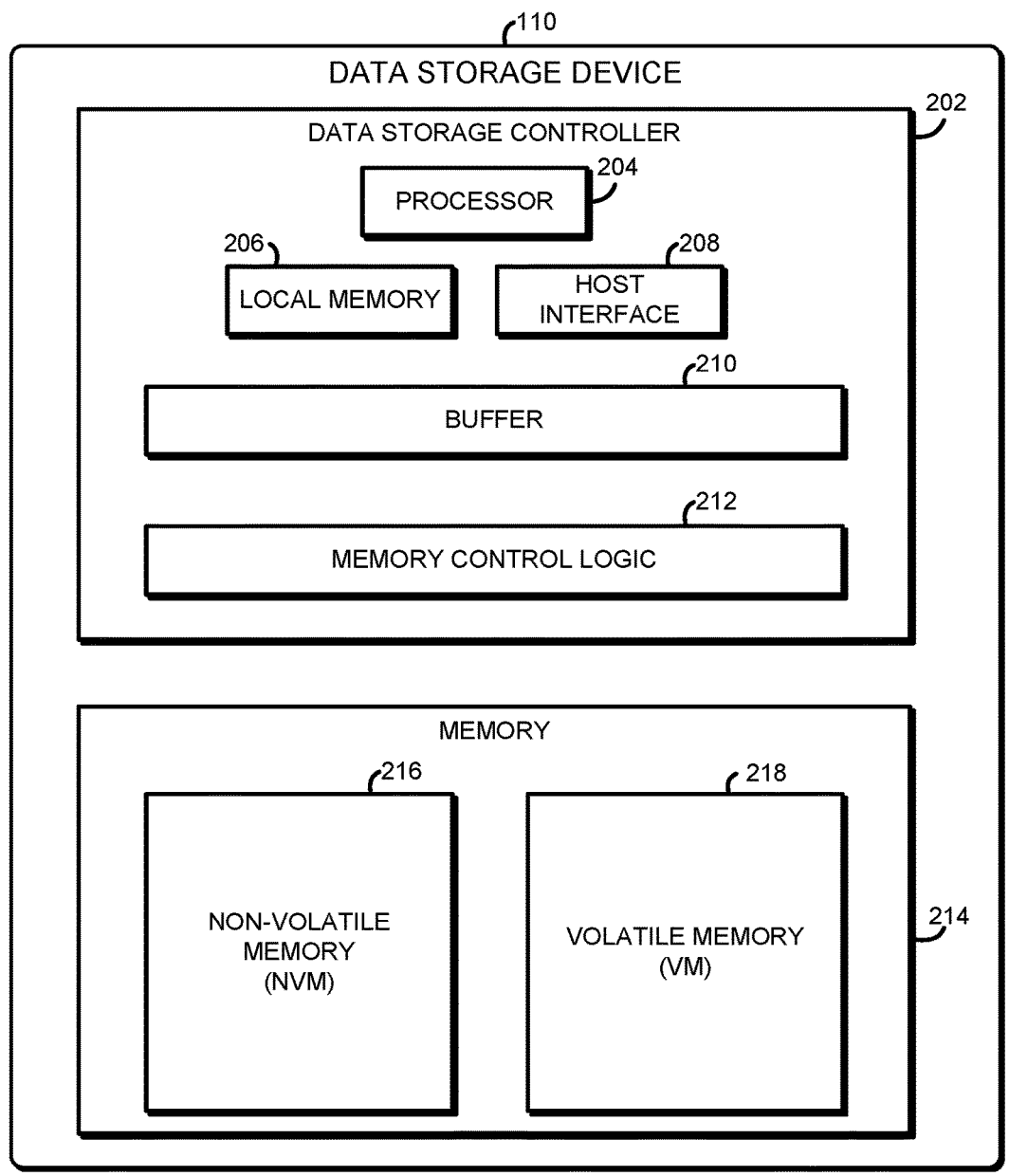
FIG. 2 is a simplified block diagram of at least one embodiment of a data storage device included in the compute device of FIG. 1.

Referring now to FIG. 2, in the illustrative embodiment, each data storage device 110 includes a data storage controller 202 and a memory 214, which illustratively includes a non-volatile memory 216 and a volatile memory 218. The local memory 206 and/or the memory 214 may store an MSI-X table which may be embodied as any data indicative of messages that may be sent to the data storage device 110 through message signaled interrupts (e.g., by writing to the main memory 104), and a pending bit array (PBA) indicative of a status (e.g., pending or not) of the possible messages represented in the MSI-X table.

As discussed in more detail below, during use, the data storage controller 202 is configured to respond to messages, such as messages signaled by interrupts (e.g., MSI-X messages) to read and/or write data to the memory 214 (e.g., the non-volatile memory 216) and to provide data indicative of the status of the messages (e.g., the pending bit array data). In the illustrative embodiment, the data storage controller 202 includes a processor or processing circuitry 204, local memory 206, a host interface 208, a buffer 210, and memory control logic (also referred to herein as a "memory controller") 212. The memory controller 212 can be in the same die or integrated circuit as the processor 204 or the memory 206, 214 or in a separate die or integrated circuit than those of the processor 204 and the memory 206, 214. In some cases, the processor 204, the memory controller 212, and the memory 206, 214 can be implemented in a single die or integrated circuit. Of course, the data storage controller 202 may include additional devices, circuits, and/or components commonly found in a drive controller of a solid state drive in other embodiments.

The processor 204 may be embodied as any type of processor capable of performing the functions described herein. For example, the processor 204 may be embodied as a single or multi-core processor(s), digital signal processor, microcontroller, or other processor or processing/controlling circuit. Similarly, the local memory 206 may be embodied as any type of volatile and/or non-volatile memory or data storage capable of performing the functions described herein. In the illustrative embodiment, the local memory 206 stores firmware and/or other instructions executable by the processor 204 to perform the described functions of the data storage controller 202. In some embodiments, the processor 204 and the local memory 206 may form a portion of an SoC and be incorporated, along with other components of the data storage controller 202, onto a single integrated circuit chip.

The host interface 208 may also be embodied as any type of hardware processor, processing circuitry, input/output circuitry, and/or collection of components capable of facilitating communication of the data storage device 110 with a host device or service (e.g., a host driver or application executed by the processor 102 of the compute device 100). That is, the host interface 208 embodies or establishes an interface for accessing data stored on the data storage device 110 (e.g., stored in the memory 214). To do so, the host interface 208 may be configured to utilize any suitable communication protocol and/or technology to facilitate communications with the data storage device 110 depending on the type of data storage device. For example, the host interface 208 may be configured to communicate with a host device or service using PCIe, SATA, Serial Attached SCSI (SAS), Universal Serial Bus (USB), and/or other communication protocol and/or technology in some embodiments.

The buffer 210 of the data storage controller 202 is embodied as volatile memory used by the data storage controller 202 to temporarily store data that is being read from or written to the memory 214. The particular size of the buffer 210 may be dependent on the total storage size of the memory 214. The memory control logic 212 is illustratively embodied as hardware circuitry and/or device configured to control the read/write access to data at particular storage locations of the memory 214.

The non-volatile memory 216 may be embodied as any type of data storage capable of storing data in a persistent manner (even if power is interrupted to the non-volatile memory 216). For example, in the illustrative embodiment, the non-volatile memory is embodied as Flash memory (e.g., NAND memory). In other embodiments, the non-volatile memory 216 may be embodied as any combination of memory devices that use chalcogenide phase change material (e.g., chalcogenide glass), byte or block-addressable, write-in-place non-volatile memory, ferroelectric transistor random-access memory (FeTRAM), nanowire-based non-volatile memory, phase change memory (PCM), memory that incorporates memristor technology, magnetoresistive random-access memory (MRAM) or spin transfer torque (STT)-MRAM.

The volatile memory 218 may be embodied as any storage medium that requires power to maintain the state of data stored by the medium. Examples of volatile memory may include various types of random access memory (RAM), such as dynamic random access memory (DRAM) or static random access memory (SRAM). One particular type of DRAM that may be used is synchronous dynamic random access memory (SDRAM). In particular embodiments, the DRAM complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the data storage devices 110 that implement such standards may be referred to as DDR-based interfaces.

Figure 3:
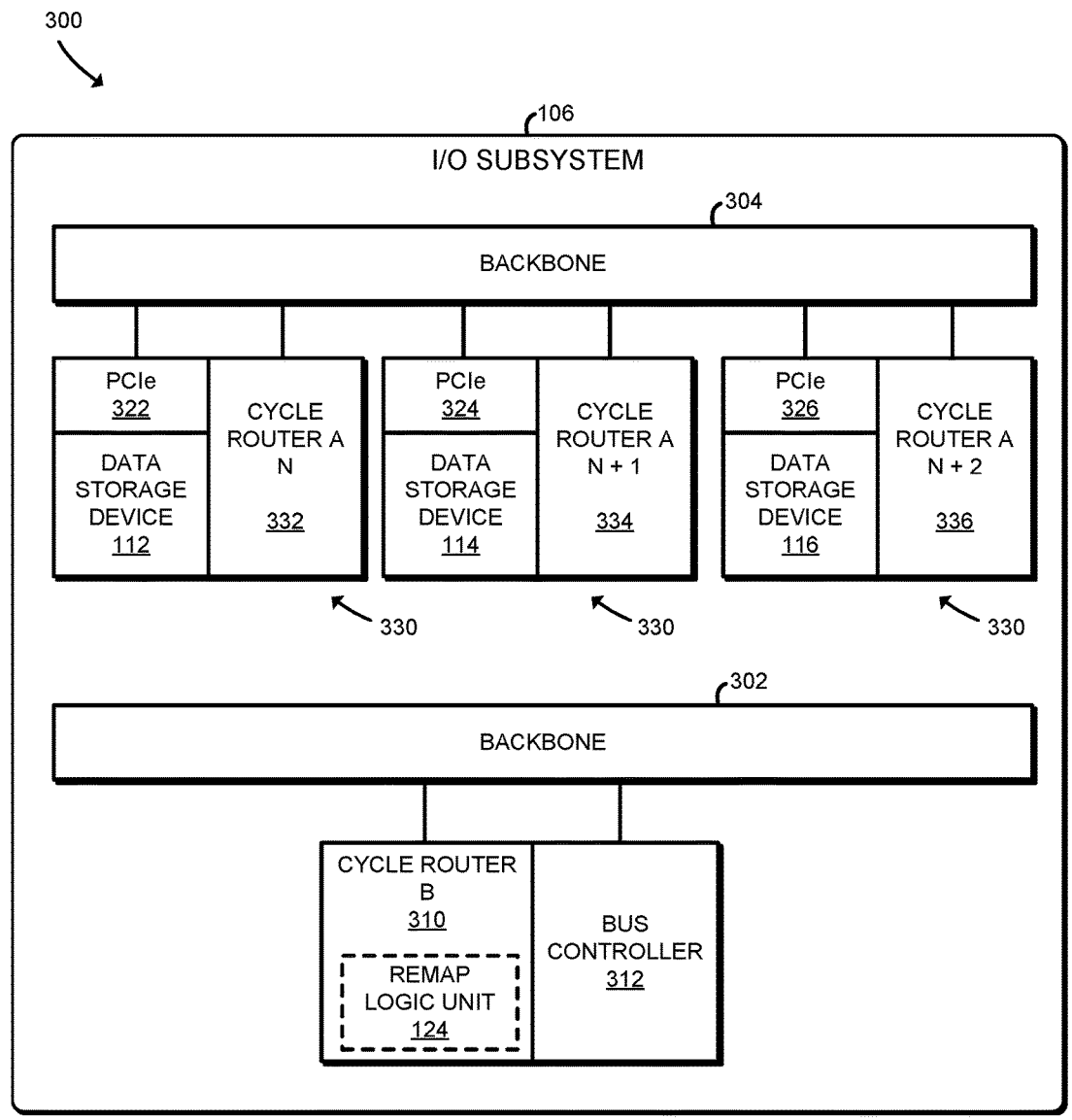
FIG. 3 is a simplified block diagram of at least one embodiment of an input/output system of the compute device of FIG. 1.

Referring now to FIG. 3, an embodiment of the I/O subsystem 106 may form an architecture 300, referred to herein as a fabric, through which components of the compute device 100 may communicate. The fabric 300 includes backbones 302, 304, which may be embodied as data communication buses capable of communicating data to and from devices connected to the backbones 302, 304. Additionally, each backbone 302, 304 is connected to a corresponding cycle router 310, 330, each of which may be embodied as any device capable of routing data to and from devices on the corresponding backbone 302, 304 or to the other cycle router 310, 330. In the illustrative embodiment, a bus controller 312 (e.g., an AHCI SATA bus controller) is connected to the backbone 302. Additionally, the cycle router 310 is connected to the backbone 302. In operation, the cycle router 310 may receive a read request (e.g., from software executed by the processor 102) to read PBA data from a main PBA exposed to the software, and remap attributes of the request to corresponding address data that is usable by the cycle router 330 to route one or more corresponding read requests to one or more of the data storage devices 110 corresponding to the requested PBA data, such as through the corresponding PCIe interfaces 322, 324, 326 of the data storage devices 112, 114, 116. The cycle router 310 may also receive the PBA data associated with the various data storage devices 110 and merge the PBA data back into the main PBA for use by the software that requested the PBA data. As such, in the illustrative embodiment, the cycle router 310 may include the remap logic unit 124. Further, in the illustrative embodiment, the cycle router 330 may include multiple subcomponents 332, 334, 336 capable of routing data to and from a corresponding data storage device 112, 114, 116.

Figure 4:
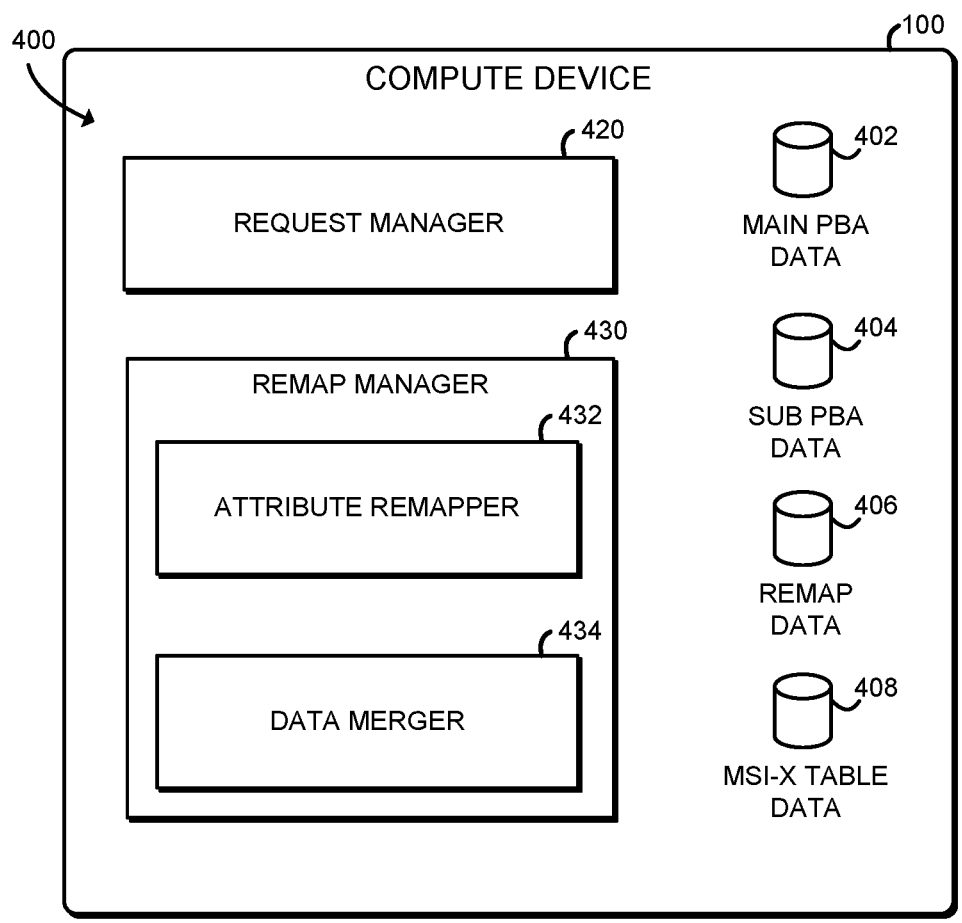
FIG. 4 is a simplified block diagram of at least one embodiment of an environment that may be established by the compute device of FIG. 1.

Referring now to FIG. 4, in use, the compute device 100 may establish an environment 400. The illustrative environment 400 includes a request manager 420 and a remap manager 430. Each of the components of the environment 400 may be embodied as firmware, software, hardware, or a combination thereof. For example, the various components and logic of the environment 400 may form a portion of, or otherwise be established by, the I/O subsystem 106, the remap logic unit 124, the processor 102, the main memory 104, and/or the data storage subsystem 108. As such, in some embodiments, any one or more of the components of the environment 400 may be embodied as a circuit or collection of electrical devices (e.g., a request manager circuit 420, a remap manager circuit 430, etc.). In the illustrative embodiment, the environment 400 includes main pending bit array (PBA) data 402, which may be embodied as any data indicative of a combined set of the pending bit arrays of the data storage devices 110 and of the bus controller 312. Additionally, in the illustrative embodiment, the environment 400 includes sub PBA data 404 which may be embodied as any data indicative of each individual pending bit array for each of the data storage devices 110 (e.g., in the local memory 206 of the corresponding data storage device 110) and the bus controller 312. As such, in the illustrative embodiment, the main PBA data 402 includes the sub PBA data 404 of each of the data storage devices 110 and the bus controller 312, mapped into a different address space such that the sub PBA data 404 is exposed to software through a single PBA. Additionally, in the illustrative embodiment, the environment 400 includes remap data 406 which may be embodied as any data indicative of attributes of one or more read requests for PBA data that are directed to the address space of the main PBA data 402, and translated versions of the attributes that correspond to the address space of the sub PBA data 404. Additionally, the environment 400 may include MSI-X table data 408 which may be embodied as any data indicative of a combined set of message signaled interrupt tables of each of the data storage devices 110 and the bus controller 312.

In the illustrative embodiment, the request manager 420, which may be embodied as hardware, firmware, software, virtualized hardware, emulated architecture, and/or a combination thereof as discussed above, is configured to receive a request, such as from software executed by the processor 102, to read pending bit array data. In the illustrative embodiment, the request includes attribute data which may be embodied as any data indicative of a section of the main PBA data 402 to read. The request manager 420, in the illustrative embodiment is additionally configured to route requests, such as read requests with translated attributes associated with the address spaces of the sub PBA data 404, among the devices (e.g., the data storage devices 110) within the fabric 300 of FIG. 3 and receive sub PBA data 404 from the devices (e.g., the data storage devices 110) in response to the requests.

The remap manager 430, which may be embodied as hardware, firmware, software, virtualized hardware, emulated architecture, and/or a combination thereof as discussed above, is configured to remap the attribute data from the address space of the main PBA data 402 to the corresponding address spaces of the sub PBA data 404 and to merge sub PBA data 404 received from one or more devices (e.g., one or more of the data storage devices 110) back into the main PBA data 402. To do so, in the illustrative embodiment, the remap manager 430 includes an attribute remapper 432 and a data merger 434. The attribute remapper 432, in the illustrative embodiment, is configured to determine one or more bit addresses from the attribute data, compare the one or more bit addresses to addresses of the sub PBAs in the main PBA to determine a set of the sub PBAs to be read, and map the one or more bit addresses to the determined set of sub PBAs to be read. The data merger 434, in the illustrative embodiment, is configured to merge the received PBA data from the sub PBAs (e.g., the sub PBA data 404) into the main PBA (e.g., the main PBA data 402). It should be appreciated that each of the attribute remapper 432 and the data merger 434 may be separately embodied as hardware, firmware, software, virtualized hardware, emulated architecture, and/or a combination thereof. For example, the attribute remapper 432 may be embodied as a hardware component, while the data merger 434 is embodied as a virtualized hardware component or as some other combination of hardware, firmware, software, virtualized hardware, emulated architecture, and/or a combination thereof.

Figure 5:
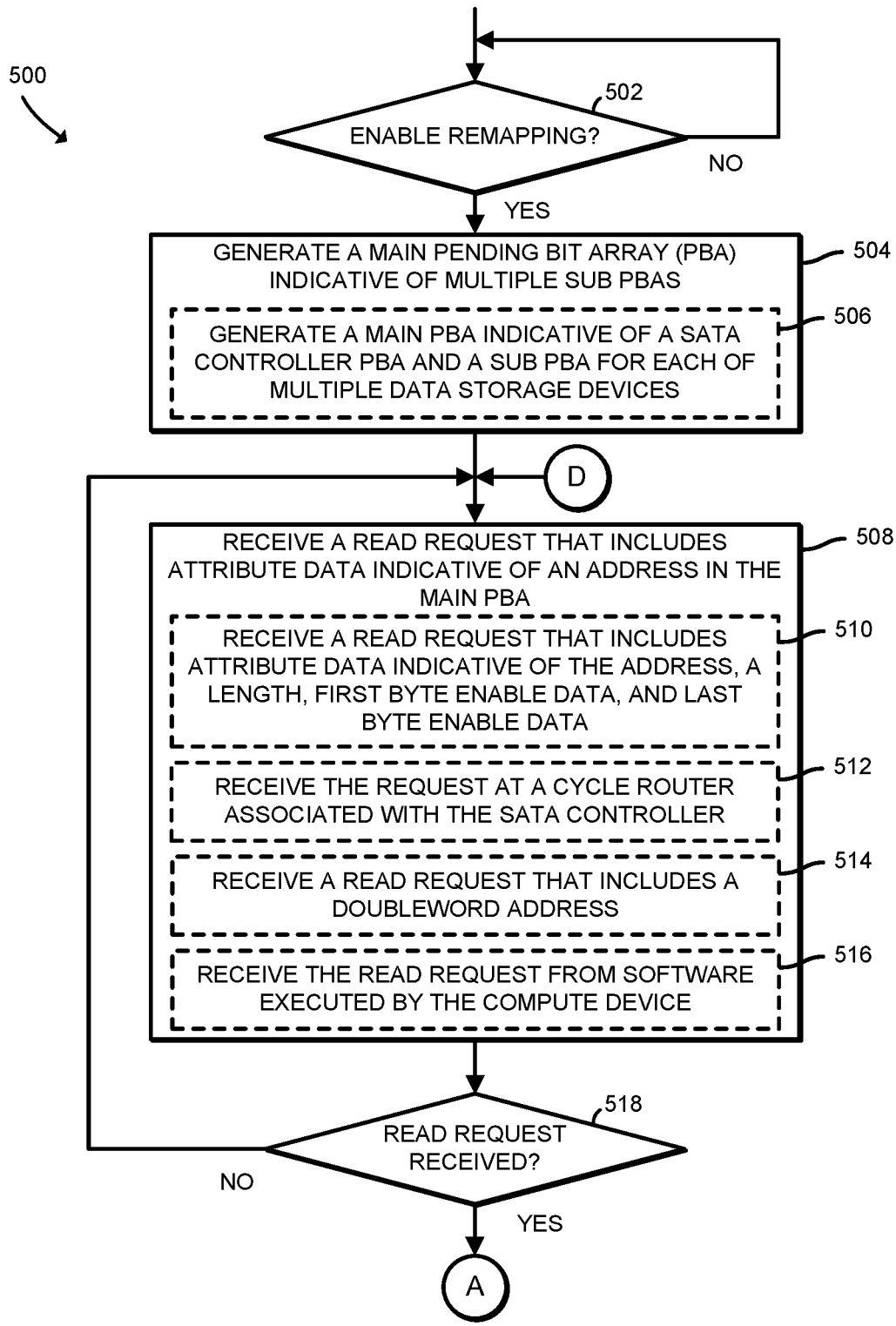
FIGS. 5-8 are a simplified flow diagram of at least one embodiment of a method for remapping accesses to pending bit array data that may be executed by the compute device of FIG. 1.

Referring now to FIG. 5, in use, the compute device 100 may execute a method 500 for remapping accesses (e.g., read requests) to pending bit array data. The method 500 begins with block 502 in which the compute device 100 determines whether to enable remapping of accesses to pending bit array data. In the illustrative embodiment, the compute device 100 may determine to enable remapping if the data storage devices 110 are capable of supporting (e.g., responding to) message signaled interrupts (e.g., MSI-X). In other embodiments, the compute device 100 may determine to enable remapping based on other factors. Regardless, in response to a determination to enable remapping, the method 500 advances to block 504 in which the compute device 100 generates a PBA indicative of multiple sub PBAs. In doing so, in the illustrative embodiment, the compute device 100 generates a main PBA (e.g., the main PBA data 402) indicative of a SATA controller (e.g., the bus controller 312) PBA and a sub PBA for each of the multiple data storage devices 110 (e.g., the sub PBA data 404), as indicated in block 506. Subsequently, the method 500 advances to block 508 in which the compute device 100 receives a request that includes attribute data indicative of an address in the main PBA (e.g., in the address space of the main PBA data 402). In doing so, in the illustrative embodiment, the compute device 100 may receive a request that includes attribute data indicative of the address, a length (e.g., an amount of data to read starting from the address), first byte enable data indicative of which of four bytes in a first doubleword associated with the request are valid, and last byte enable data indicative of which of four bytes in a last doubleword associated with the request are valid, as indicated in block 510. In the illustrative embodiment, the compute device 100 receives the read request at the cycle router 310 associated with the SATA controller (e.g., the bus controller 312), as indicated in block 512. Additionally, as indicated in block 514, in receiving the read request, the compute device 100 receives a read request in which the address is a doubleword address. Further, in the illustrative embodiment, the compute device 100 receives the read request from software executed by the compute device 100 (e.g., by the processor 102). In block 518, the compute device 100 determines whether a read request was received. If not, the method 500 loops back to block 508, in which the compute device 100 continues to await a read request. Otherwise, the method 500 advances to block 520 of FIG. 6, in which the compute device 100 remaps the read request (e.g., the attribute data of the read request) to one or more sub PBAs (e.g., the address space(s) of one or more sets of sub PBA data 404).

Figure 6:
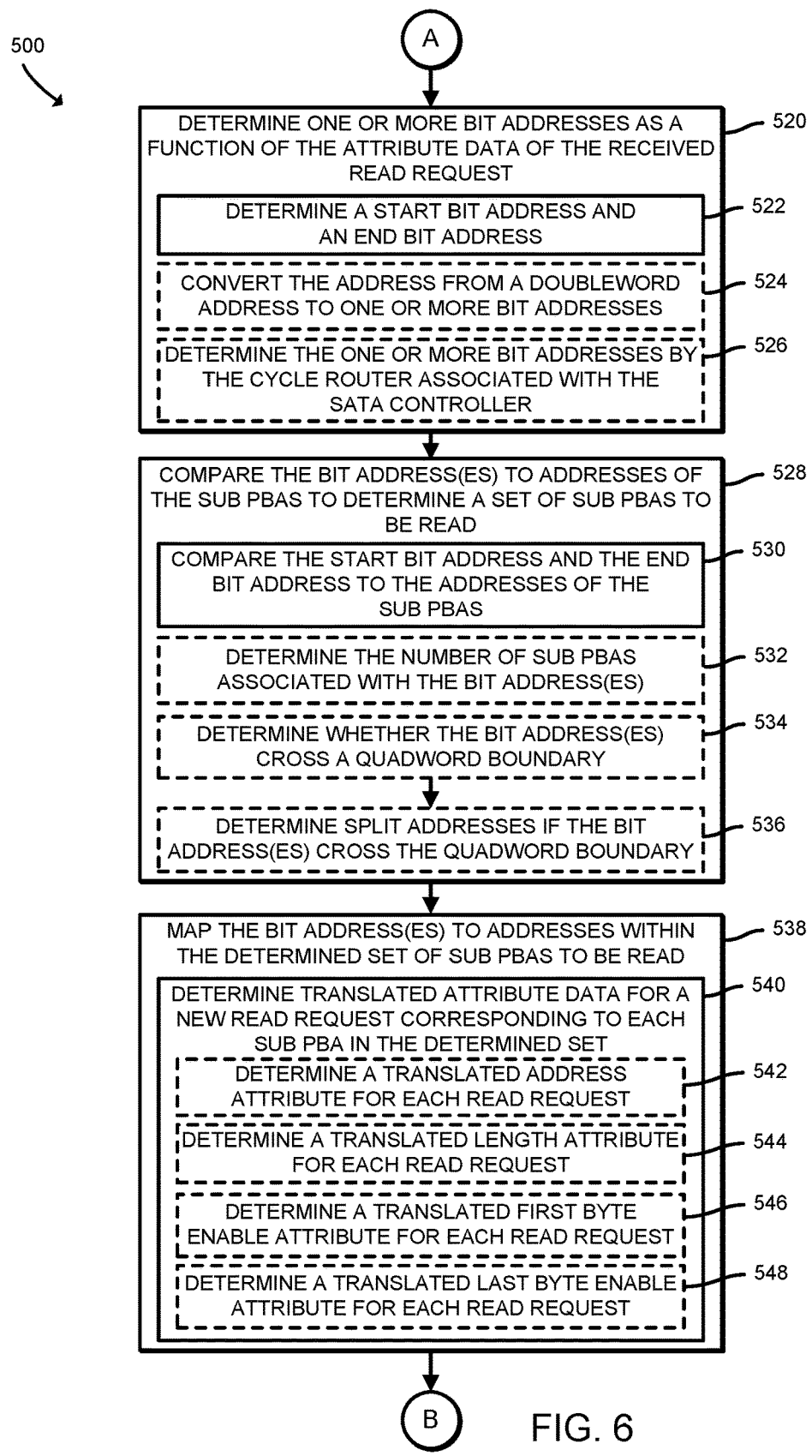

Referring now to FIG. 6, in block 520, the compute device 100 determines one or more bit addresses as a function of the attribute data of the received read request. In doing so, in the illustrative embodiment, the compute device 100 determines a start bit address and an end bit address, as indicated in block 522. In determining the one or more bit addresses, the compute device 100, in the illustrative embodiment, converts the address in the attribute data from a doubleword address to the one or more bit addresses, as indicated in block 524. In the illustrative embodiment, the cycle router 310 associated with the SATA controller (e.g., the bus controller 312) determines the one or more bit addresses, as indicated in block 526. Referring now to FIG. 9, pseudocode 900 includes a set of instructions 910 for calculating the start bit address and another set of instructions 920 usable to determine the end bit address as a function of the attribute data (e.g., the address (ADDR), the first byte enable (FBE) data, the last byte enable (LBE) data, and the length (LEN) data).

Figure 10:
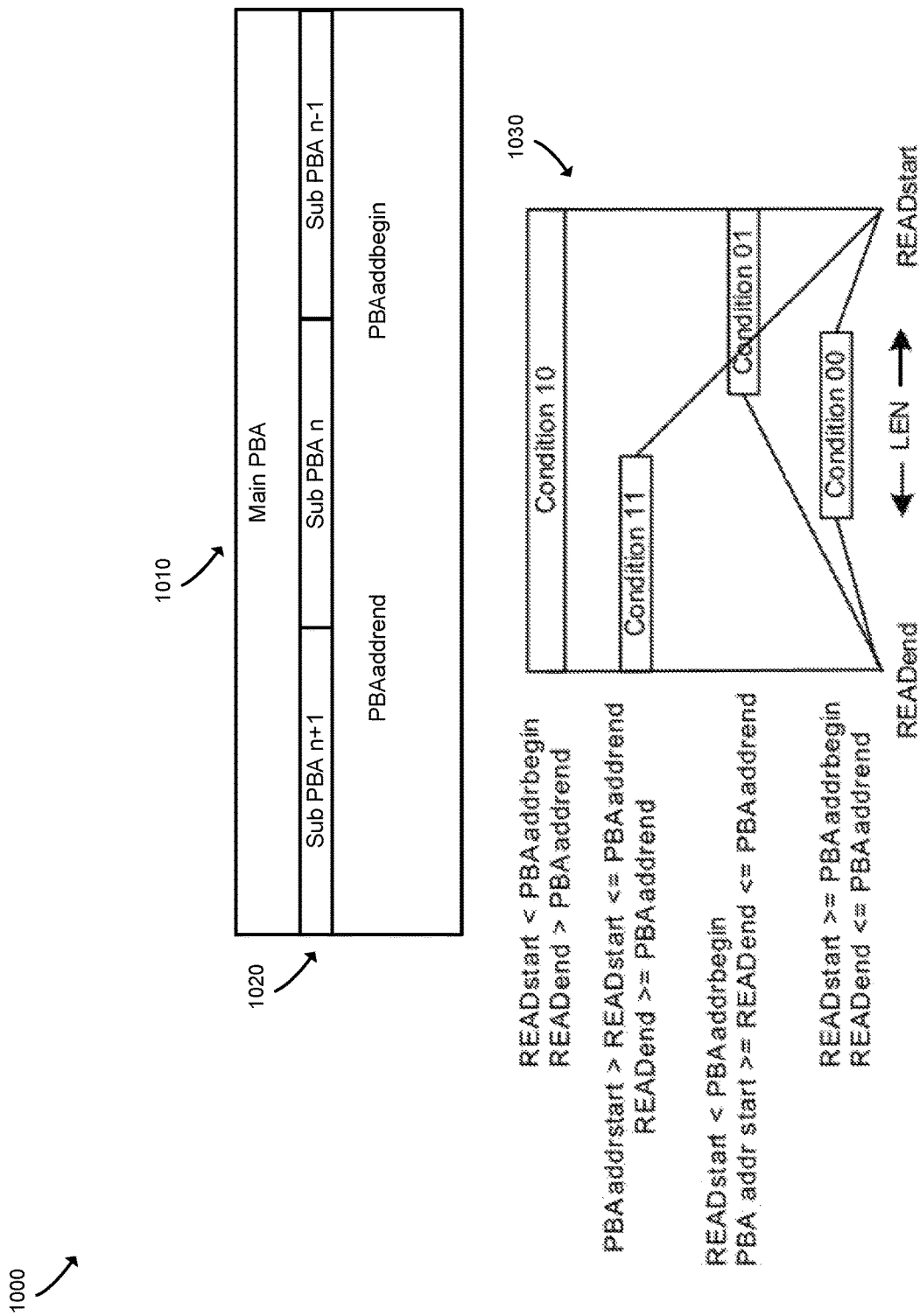
FIG. 10 is a simplified block diagram of an arrangement of sub pending bit arrays within a main pending bit array address space, and corresponding conditions indicative of various sets of the sub pending bit arrays that may be associated with a read request.

Referring back to FIG. 6, the method 500 subsequently advances to block 528 in which the compute device 100 compares the one or more bit addresses determined in block 520 to addresses of the sub PBAs (e.g., the locations of each set of sub PBA data 404 in the main PBA data 402) to determine the set of sub PBAs (e.g., the sub PBA data 404) to be read. In doing so, in the illustrative embodiment, the compute device 100 compares the start bit address and the end bit address (e.g., the addresses determined in block 522) to the addresses of the sub PBAs, as indicated in block 530. In the illustrative embodiment, the compute device 100 determines the number of sub PBAs associated with the bit addresses, as indicated in block 532. Additionally, the compute device 100 determines whether the bit addresses cross a quadword boundary, as indicated in block 534. In response to a determination that the bit addresses do cross a quadword boundary, the compute device 100, in the illustrative embodiment, determines one or more split addresses (e.g., addresses on either side of the quadword boundary), as indicated in block 536. Referring now to FIG. 10, an arrangement 1000 of sub PBAs 1020 within the main PBA address space 1010, and corresponding conditions 1030 (e.g., condition 00, condition 01, condition 10, and condition 11) indicative of the various sets of sub PBAs that may be associated with the set of bit addresses are shown. In condition 00, the entire read is within one of the sub PBAs. By contrast, in condition 01, the read starts from one sub PBA (e.g., sub PBA n−1) and crosses over to and ends at the next sub PBA (e.g., sub PBA n). Similarly, in condition 10, the read starts from one sub PBA (e.g., sub PBA n−1), and crosses over to the next sub PBA (e.g., sub PBA n). However, in condition 10, the read ends in the subsequent sub PBA (e.g., sub PBA n+1). Finally, in condition 11, the read starts from one sub PBA (e.g., sub PBA n) and crosses over to an ends in the following sub PBA (e.g., sub PBA n+1).

Referring back to FIG. 6, the method 500 subsequently advances to block 538 in which the compute device 100 maps the bit addresses to the addresses of the determined set of sub PBAs to be read (e.g., the set determined in block 528). In doing so, in the illustrative embodiment, the compute device 100 determines translated attribute data for a new read request corresponding to each sub PBA in the determined set, as indicated in block 540. In the illustrative embodiment, the compute device 100 determines a translated address attribute for each new read request, as indicated in block 542. Further, the compute device 100 determines a translated length attribute for each new read request, as indicated in block 544. Additionally, the compute device 100 determines a translated first byte enable attribute for each new read request, as indicated in block 546. The compute device 100 also determines a translated last byte enable attribute for each read request, as indicated in block 548. Referring now to FIG. 11, psueudocode 1100 includes a set of instructions 1110 usable to determine a translated starting address for conditions 00 and 11 and a set of instructions 1120 usable to determine the translated starting address for conditions 01 and 10 based on the comparison of the starting bit address to the addresses of the sub PBAs in block 530. Additionally, the pseudocode 1100 includes a set of instructions 1130 usable to determine an ending address for conditions 00 and 01 and another set of instructions 1140 usable to determine the ending address for conditions 10 and 11. The compute device 100 may split a translated address when the read request crosses a quadword boundary. In such circumstances, the compute device 100 generates two read requests, with one read request starting from the translated ADDR[63:0] and ending at the quadword boundary, while the second request starts from the quadword boundary and extends to the translated ADDRend[63:0]. The split is true when the translated ADDRend[3] is not equal to ADDR[3].

In determining the translated length attribute, the compute device 100, in the illustrative embodiment, determines the length as a function of (i) whether a split operation was performed and (ii) the condition of the sub PBA read address, as shown in Table 1, below.

TABLE 1

| SPLIT? | Sub PBA read address condition | Translated LEN at sub PBA |
|---|---|---|
| No | Translated ADDR[2] = 0<br>Translated Addrend[2] = 1 | 2 |
| Yes | Translated ADDR[2] = 1<br>Translated Addrend[2] = 0 | 1 |
| No | Translated ADDR[3:2] =<br>Translated Addrend[3:2] | 1 |
| Yes | Translated ADDR[3:2] = 10<br>Translated Addrend[3:2] = 00 | 2 |

Further, in the illustrative embodiment, the compute device 100 may determine the translated first byte enable attribute as a function of data in the translated address attribute (i.e., ADDR[1:0]), as shown in Table 2, below.

TABLE 2

| When Translated ADDR[1:0] is | Translated FBE[3:0] at sub PBA is |
|---|---|
| 11 | 1000B |
| 10 | 1100B |
| 01 | 1110B |
| 00 | 1111B |

Additionally, in the illustrative embodiment, the compute device 100 may determine the translated last byte enable attribute as a function of the translated end address, the translated length attribute, whether a split was performed, and the translated last byte enabled attribute, as shown in Table 3, below:

TABLE 3

| When translated end address[1:0] at sub PBA is | AND translated LEN at sub PBA is | AND 1$^{st}$ split request? | Translated LBE[3:0] at sub PBA is |
|---|---|---|---|
| X | NOT 1 | Yes | 1111B |
| 11 | NOT 1 | X | 1111B |
| 10 | NOT 1 | X | 0111B |
| 01 | NOT 1 | X | 0011B |
| 00 | NOT 1 | X | 0001B |
| X | 1 | X | 0000B |

Figure 7:
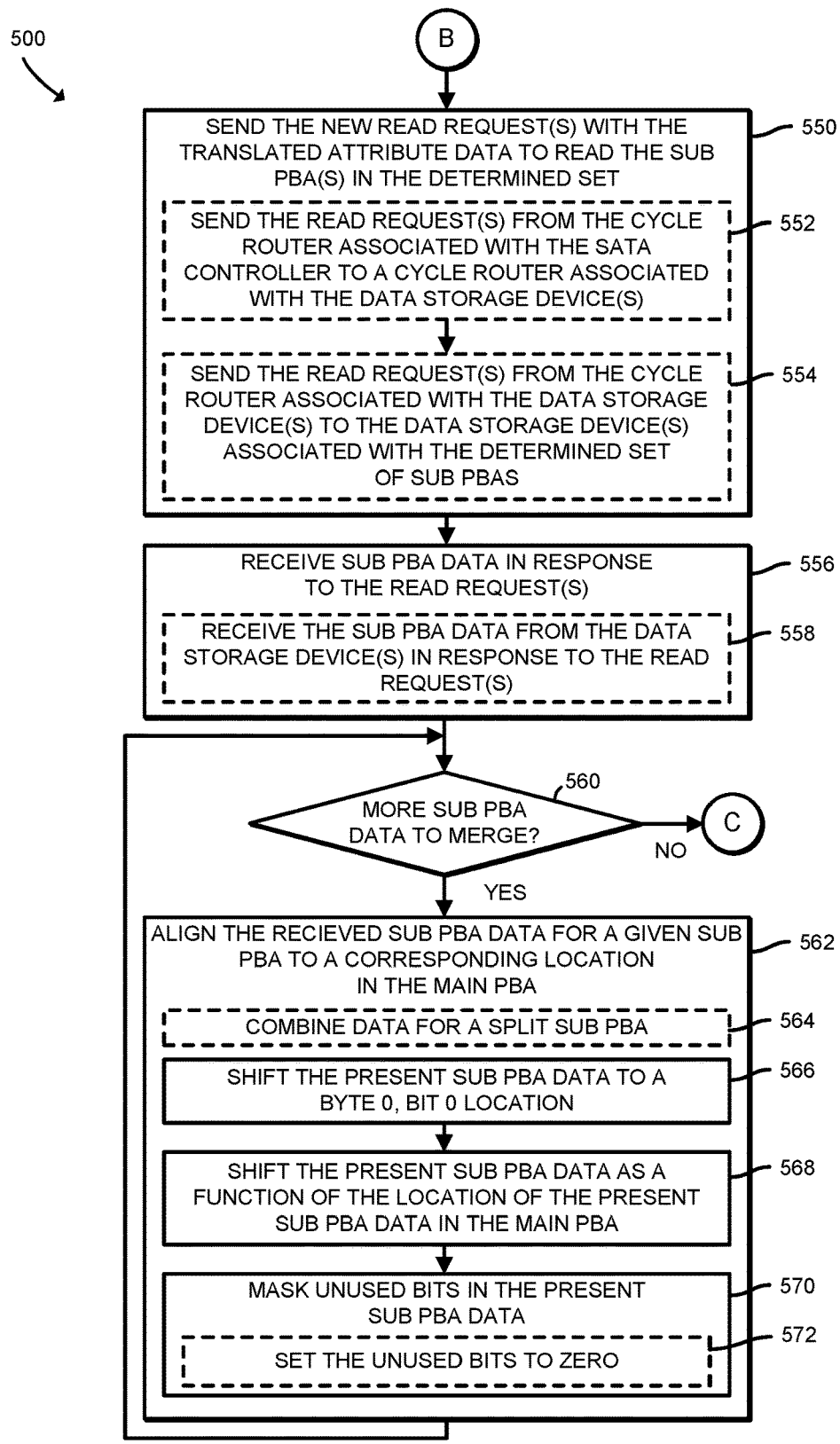

Subsequently, the method advances to block 550 of FIG. 7, in which the compute device 100 sends the one or more new read requests (e.g., the new request(s) generated in block 540 of FIG. 6) with the translated attribute data to read the one or more sub PBAs (e.g., the sub PBA data 404) in the determined set (e.g., the set determined in block 528 of FIG. 6). In doing so, the cycle router (e.g., the cycle router 310) associated with the SATA controller (e.g., the bus controller 312) may send the new read request(s) to a cycle router (e.g., cycle router 330) associated with the data storage devices 110, as indicated in block 552. In turn, the cycle router associated with the data storage devices 110 (e.g., the cycle router 330) may send the new read request(s) to the one or more data storage devices 110 associated with the determined set of sub PBAs (e.g., the data storage devices 110 having the requested sub PBA data 404 in their memory 206, 214), as indicated in block 554.

Afterwards, the method 500 advances to block 556, in which the compute device 100 receives the requested sub PBA data 404 in response to the new read request(s), as indicated in block 556. In doing so, the compute device 100 receives the sub PBA data 404 from the data storage devices 110 in response to the new read request(s), as indicated in block 558. In the illustrative embodiment, the cycle router 330 initially receives the requested sub PBA data 404 from the data storage devices 110, then routes it to the cycle router 310. Subsequently, in block 560, the compute device 100, having received the sub PBA data 404 from one or more of the data storage devices 110, begins a process of merging the received sub PBA data 404 back into the main PBA data 402 (e.g., for use by software executed by the processor 102). In block 560, the compute device 100 determines whether there is sub PBA data 404 to be merged. In response to a determination that there is sub PBA data 404 to be merged, the method 500 advances to block 562, in which the compute device 100 aligns the received sub PBA data 404 for a given sub PBA to a corresponding location in the main PBA (e.g., the main PBA data 402). In doing so, the compute device 100 may combine data for a split sub PBA, as indicated in block 564. Additionally, in aligning the received sub PBA data 404, the compute device 100 shifts the present sub PBA data 404 to an initial byte 0, bit 0 location, as indicated in block 566. Subsequently, the compute device 100 shifts the present sub PBA data 404 as a function of the location of the sub PBA data 404 in the main PBA (e.g., the main PBA data 402), as indicated in block 568. Further, the compute device 100 masks unused bits in the sub PBA data 404, as indicated in block 570. In doing so, in the illustrative embodiment, the compute device 100 sets the unused bits to zero, as indicated in block 572.

Figure 8:
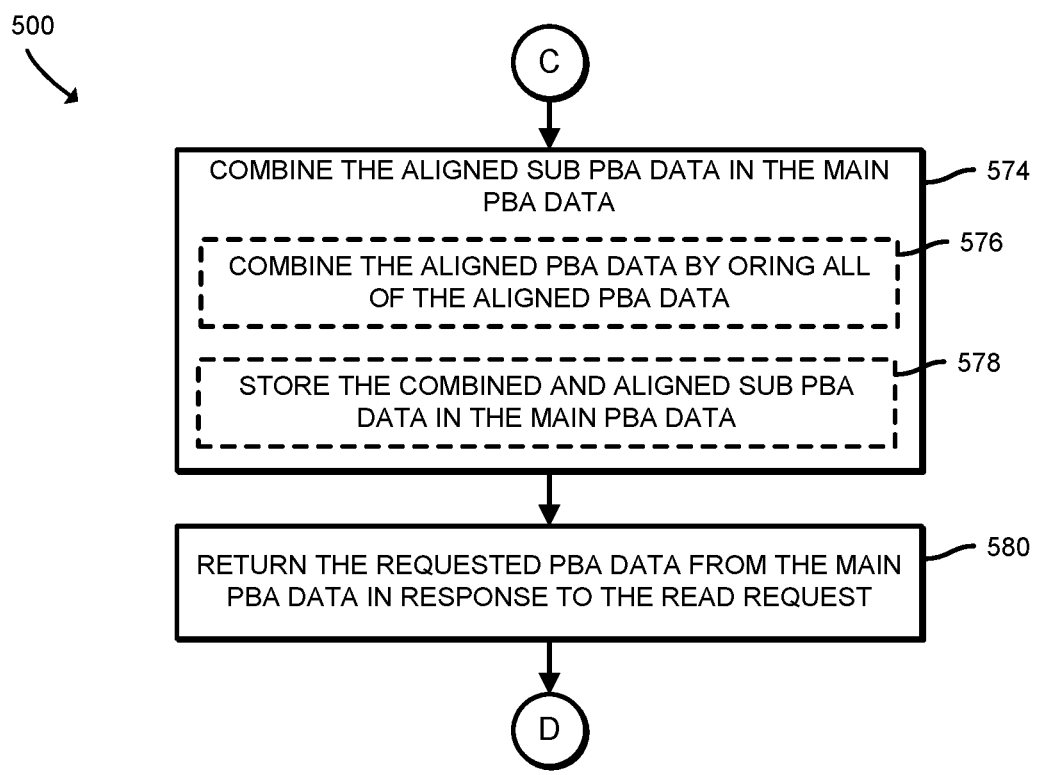

Subsequently, the method 500 loops back to block 560 to determine whether additional sub PBA data 404 has been received (e.g., sub PBA data 404 from a different data storage device 110). If so, the method 500 advances to block 562 to align the additional sub PBA data 404. The method 500 may loop through blocks 560 through 572 until all of the received sub PBA data 404 has been aligned. It should be understood that while blocks 560 through 572 are shown in sequence, as if each set of sub PBA data 404 is operated on sequentially, the compute device 100 may instead concurrently align all of the received sub PBA data 404. In response to a determination, at block 560, that there is no more sub PBA data 404 to merge, the method 500 advances to block 574 of FIG. 8, in which the compute device 100 combines the aligned sub PBA data 404 in the main PBA data 402. In doing so, the compute device 100 may combine the aligned PBA data by ORing all of the aligned PBA data together, as indicated in block 576. Further, in the illustrative embodiment, the compute device 100 stores the combined and aligned sub PBA data 404 in the main PBA data 402, as indicated in block 578. In the illustrative embodiment, the cycle router 310 may perform the operations in blocks 562 through 578. Subsequently, in block 580, the compute device 100 returns the requested PBA data from the main PBA data 402 in response to the read request (e.g., to the software that requested the PBA data). Afterwards, the method 500 loops back to block 508 of FIG. 5, in which the compute device 100 awaits receipt of another read request.

Figure 12:
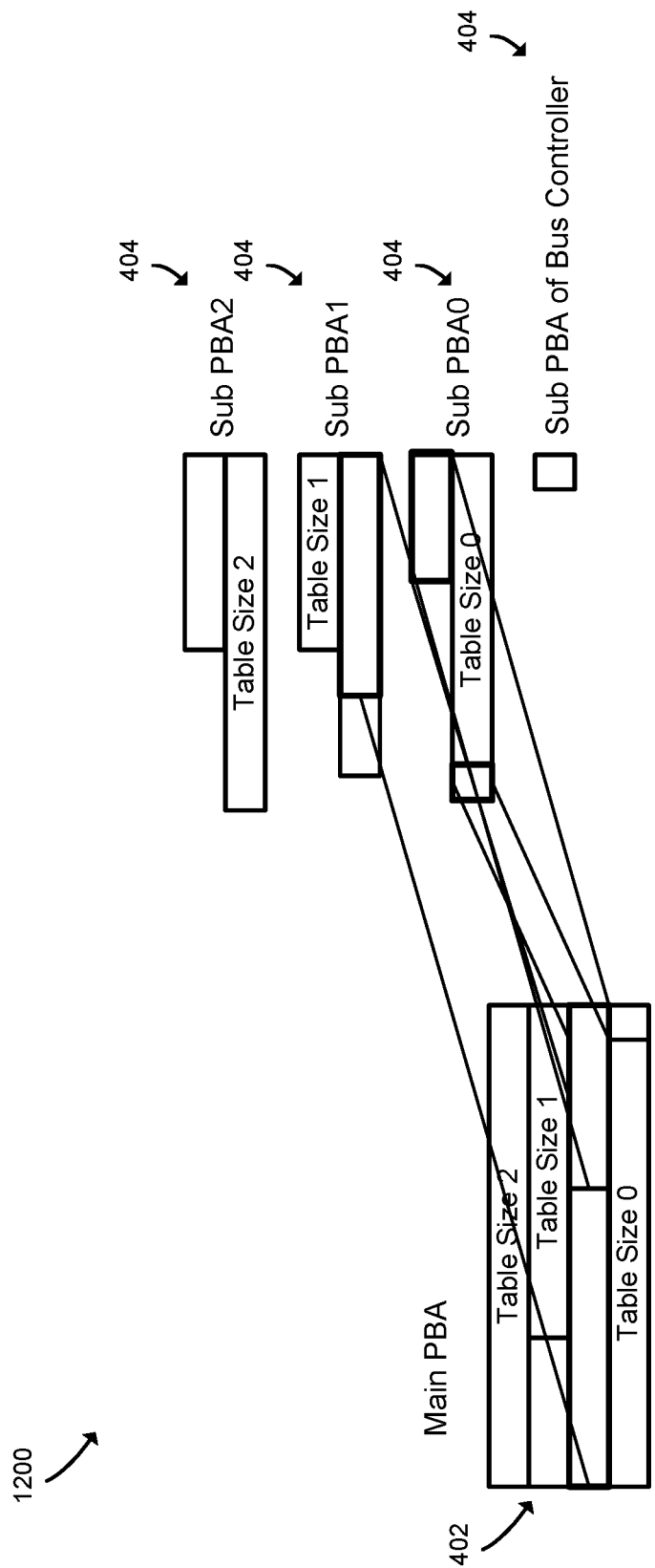
FIG. 12 is a simplified block diagram of a relationship between a main pending bit array and multiple sub pending bit arrays.
Figure 13:
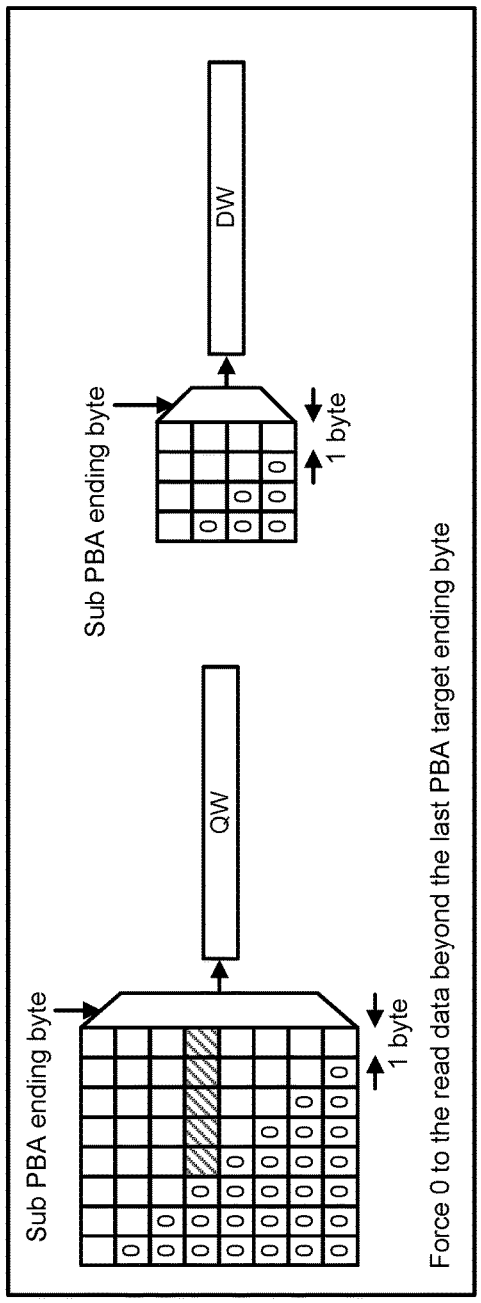
FIG. 13 is a simplified block diagram of forcing data to zero beyond a last byte of sub pending bit array data.
Figure 14:
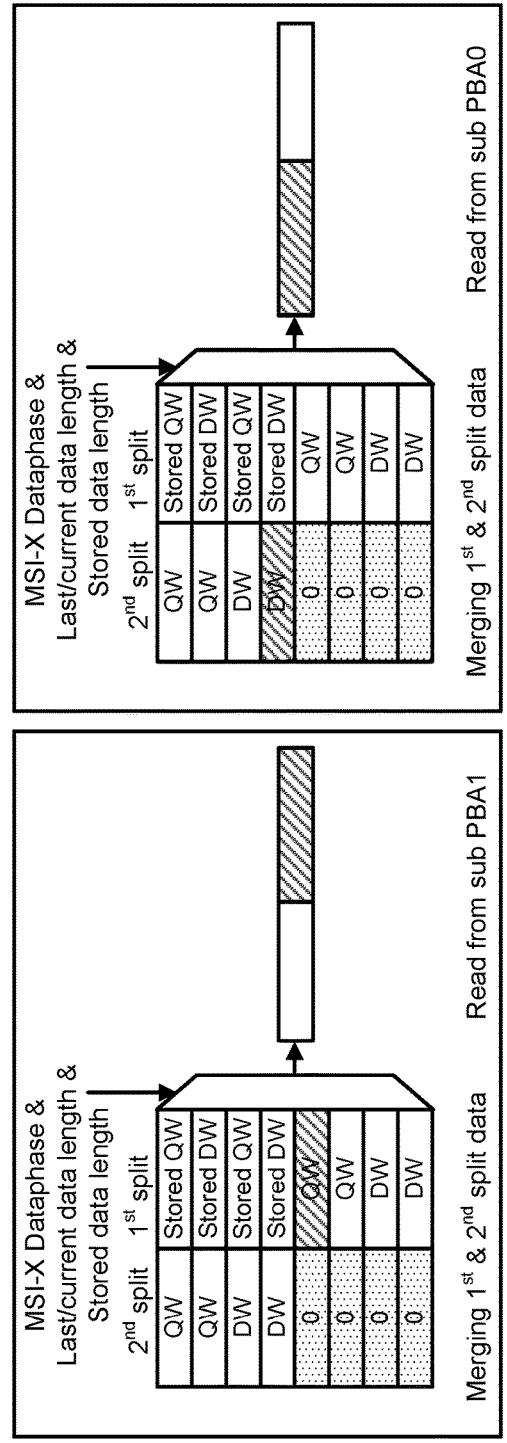
FIG. 14 is a simplified block diagram of merging split data for each of multiple sets of sub pending bit array data.

Referring now to FIG. 12, a relationship 1200 between the main PBA data 402 and the sub PBA data 404 associated with various devices, including the bus controller 312 (e.g., sub PBA AHCI), and the data storage devices 110 (e.g., sub PBA0, sub PBA1, sub PBA2) is shown. During a merge of sub PBA data 404 into the main PBA data 402, there are several possible scenarios that may occur. For example, there are at most two reads to a single set of sub PBA data 404 for a given read request to the main PBA data 402 (e.g., one read request may split into a 1$^{st}$ split and a 2$^{nd}$ split read request). However, there may be reads to more than one set of sub PBA data 404 simultaneously, including a read to the sub PBA data 404 of the bus controller 312. Alternatively, there may be one read to just one set of the sub PBA data 404 (e.g., sub PBA data 404 associated with only one of the data storage devices 110). Still referring to FIG. 12, as an example scenario, there are two reads for sub PBA0 and one read for sub PBA1. The first data from sub PBA0 is a one bit read and the second data from sub PBA1 is less than a doubleword read, while the data from sub PBA1 is a cross doubleword read. Starting with the data for each individual sub PBA (e.g., each individual set of sub PBA data 404), the compute device 100 stores the data if it is the first split. Referring now to FIG. 13, the compute device 100 forces the stored data, which may be a quadword or a doubleword, to 0 beyond the last byte of the stored data. Referring now to FIG. 14, the compute device 100 merges first and second split data for each set of sub PBA data 404 that was read (e.g., for sub PBA1 and for sub PBA0). In doing so, the compute device 100 checks, at a data phase of the second split, the length of the first and second splits. Additionally, the compute device 100 concatenates the data from the previous steps. In doing so, the compute device 100 takes 32 bits of the stored data if the first split is a doubleword. Alternatively, the compute device 100 takes 64 bits of the stored data if the first split is a quadword. If there was no split, the compute device 100 uses 0's in place of the data that would otherwise be provided by a second split. Subsequently, and referring now to FIG. 15, the compute device 100 shifts the sub PBA data 404 to the byte location for the sub PBA data 404 in the address space of the main PBA data 402. For example, if the target starting byte for the sub PBA data 404 in the address space of the main PBA data 402 is byte 3, the compute device 100 shifts the sub PBA data 404 to the right by 3 bytes.

Figure 17:
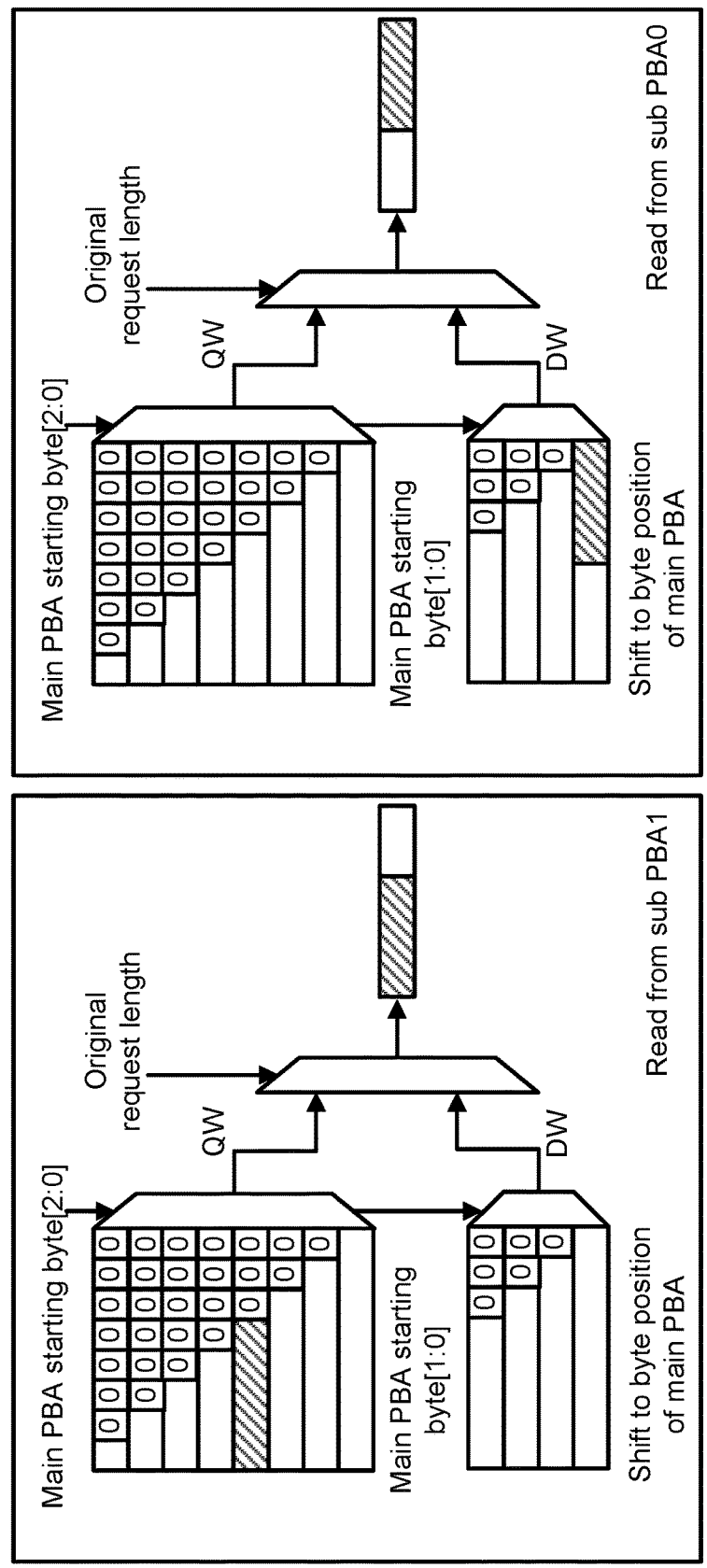
FIG. 17 is a simplified block diagram of selecting a doubleword or a quadword for reading sub pending bit array data according to a read request length.

Afterwards, and referring now to FIG. 16, the compute device 100 shifts the sub PBA data 404 according to the start bit for the sub PBA data 404 in the address space of the main PBA data 402. For example, if the starting bit for the sub PBA data 404 in the address space of the main PBA data 402 is bit 7, the compute device 100 shifts the sub PBA data 404 by 7 bits. Further, and referring now to FIG. 17, after shifting the sub PBA data 404 according to the corresponding position in the main PBA data 402, the compute device 100 selects a doubleword or a quadword according to the read request length. Subsequently, and referring now to FIG. 18, the compute device 100 again shifts the sub PBA data 404 according to the corresponding start bit in the main PBA data 402. For example if the start bit in the main PBA data 402 is at bit 7, the compute device 100 shifts the sub PBA data 404 to the right by 7 bits. Referring now to FIG. 19, after shifting the sub PBA data 404 by a number of bits, the compute device 100 masks the sub PBA data 404 beyond the last bit. Afterwards, the compute device 100 combines the sub PBA data 404 into the main PBA data 402 by ORing the sub PBA data 404 together (e.g., ORing the sub PBA1 data and the sub PBA0 data together).

References to memory devices above can apply to different memory types, and in particular, any memory that has a bank group architecture. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, initial specification published in September 2012 by JEDEC), DDR4E (in development by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device.

EXAMPLES

Illustrative examples of the technologies disclosed herein are provided below. An embodiment of the technologies may include any one or more, and any combination of, the examples described below.

Example 1 includes a compute device for remapping pending bit array read requests, the compute device comprising a plurality of data storage devices; a request manager to receive a request to read pending bit array (PBA) data from a main PBA mapped to multiple sub PBAs, wherein each sub PBA is associated with a different one of the data storage devices, and the request includes attribute data indicative of an address in the main PBA from which to read the PBA data; a remap manager to determine one or more bit addresses from the attribute data, compare the one or more bit addresses to addresses of the sub PBAs in the main PBA to determine a set of the sub PBAs to be read, and map the one or more bit addresses to the determined set of sub PBAs to be read.

Example 2 includes the subject matter of Example 1, and wherein to map the one or more bit addresses comprises to determine translated attribute data for a read request associated with each sub PBA in the determined set.

Example 3 includes the subject matter of any of Examples 1 and 2, and wherein the request manager is further to send one or more read requests to the plurality of data storage devices, to read the one or more sub PBAs in the determined set.

Example 4 includes the subject matter of any of Examples 1-3, and wherein the request manager is further to receive the PBA data from each sub PBA in the determined set, in response to the one or more read requests; and the remap manager is further to merge the received PBA data into the main PBA.

Example 5 includes the subject matter of any of Examples 1-4, and wherein to merge the received PBA data into the main PBA comprises to align the received PBA data from a sub PBA to an associated location in the main PBA; and combine the aligned PBA data in the main PBA.

Example 6 includes the subject matter of any of Examples 1-5, and wherein to combine the aligned PBA data comprises to perform an OR operation on the received PBA data associated with the sub PBAs.

Example 7 includes the subject matter of any of Examples 1-6, and wherein to align the received PBA data from the sub PBA comprises to shift the PBA data from the sub PBA to an initial location; shift the PBA data as a function of the position of the associated sub PBA in the main PBA; and mask unused bits in the PBA data associated with the sub PBA.

Example 8 includes the subject matter of any of Examples 1-7, and wherein to mask the unused bits comprises to set the unused bits to zero.

Example 9 includes the subject matter of any of Examples 1-8, and wherein to receive a read request comprises to receive a read request that includes attribute data indicative of the address in the main PBA, a length indicative of an amount of data to be read, first byte enable data, and last byte enable data; and wherein to determine translated attribute data comprises to determine a translated address, a translated length, translated first byte enable data, and translated last byte enable data.

Example 10 includes the subject matter of any of Examples 1-9, and wherein to determine one or more bit addresses comprises to determine a start bit address and an end bit address.

Example 11 includes the subject matter of any of Examples 1-10, and wherein to determine one or more bit addresses comprises to convert the address from a double-word address to one or more bit addresses.

Example 12 includes the subject matter of any of Examples 1-11, and wherein to compare the one or more bit addresses comprises to compare a start bit address and an end bit address to the addresses of the sub PBAs.

Example 13 includes the subject matter of any of Examples 1-12, and wherein the remap manager is further to determine whether the start bit address and the end bit address cross a quadword boundary; and determine, in response to a determination that the start bit address and the end bit address cross a quadword boundary, a set of split addresses.

Example 14 includes a method for remapping pending bit array read requests, the method comprising receiving, by a compute device, a request to read pending bit array (PBA) data from a main PBA mapped to multiple sub PBAs, wherein each sub PBA is associated with a different one of a plurality of data storage devices, and the request includes attribute data indicative of an address in the main PBA from which to read the PBA data; determining, by the compute device, one or more bit addresses from the attribute data; comparing, by the compute device, the one or more bit addresses to addresses of the sub PBAs in the main PBA to determine a set of the sub PBAs to be read; and mapping, by the compute device, the one or more bit addresses to the determined set of sub PBAs to be read.

Example 15 includes the subject matter of Example 14, and wherein mapping the one or more bit addresses comprises determining translated attribute data for a read request associated with each sub PBA in the determined set.

Example 16 includes the subject matter of any of Examples 14 and 15, and further including sending, by the compute device, one or more read requests to the plurality of data storage devices, to read the one or more sub PBAs in the determined set.

Example 17 includes the subject matter of any of Examples 14-16, and further including receiving, by the compute device, the PBA data from each sub PBA in the determined set, in response to the one or more read requests; and merging, by the compute device, the received PBA data into the main PBA.

Example 18 includes the subject matter of any of Examples 14-17, and wherein merging the received PBA data into the main PBA comprises aligning the received PBA data from a sub PBA to an associated location in the main PBA; and combining the aligned PBA data in the main PBA.

Example 19 includes the subject matter of any of Examples 14-18, and wherein combining the aligned PBA data comprises performing an OR operation on the received PBA data associated with the sub PBAs.

Example 20 includes the subject matter of any of Examples 14-19, and wherein aligning the received PBA data from the sub PBA comprises shifting the PBA data from the sub PBA to an initial location; shifting the PBA data as a function of the position of the associated sub PBA in the main PBA; and masking unused bits in the PBA data associated with the sub PBA.

Example 21 includes the subject matter of any of Examples 14-20, and wherein masking the unused bits comprises setting the unused bits to zero.

Example 22 includes the subject matter of any of Examples 14-21, and wherein receiving a read request comprises receiving a read request that includes attribute data indicative of the address in the main PBA, a length indicative of an amount of data to be read, first byte enable data, and last byte enable data; and wherein determining translated attribute data comprises determining a translated address, a translated length, translated first byte enable data, and translated last byte enable data.

Example 23 includes the subject matter of any of Examples 14-22, and wherein determining one or more bit addresses comprises determining a start bit address and an end bit address.

Example 24 includes the subject matter of any of Examples 14-23, and wherein determining one or more bit addresses comprises converting the address from a double-word address to one or more bit addresses.

Example 25 includes the subject matter of any of Examples 14-24, and wherein comparing the one or more bit addresses comprises comparing a start bit address and an end bit address to the addresses of the sub PBAs.

Example 26 includes the subject matter of any of Examples 14-25, and further including determining, by the compute device, whether the start bit address and the end bit address cross a quadword boundary; and determining, by the compute device and in response to a determination that the start bit address and the end bit address cross a quadword boundary, a set of split addresses.

Example 27 includes one or more machine-readable storage media comprising a plurality of instructions stored thereon that, in response to being executed, cause a compute device to perform the method of any of Examples 14-26.

Example 28 includes a compute device for remapping pending bit array read requests, the compute device comprising means for receiving a request to read pending bit array (PBA) data from a main PBA mapped to multiple sub PBAs, wherein each sub PBA is associated with a different one of a plurality of data storage devices, and the request includes attribute data indicative of an address in the main PBA from which to read the PBA data; means for determining one or more bit addresses from the attribute data; means for comparing the one or more bit addresses to addresses of the sub PBAs in the main PBA to determine a set of the sub PBAs to be read; and means for mapping the one or more bit addresses to the determined set of sub PBAs to be read.

Example 29 includes the subject matter of Example 28, and wherein the means for mapping the one or more bit addresses comprises means for determining translated attribute data for a read request associated with each sub PBA in the determined set.

Example 30 includes the subject matter of any of Examples 28 and 29, and further including means for sending one or more read requests to the plurality of data storage devices, to read the one or more sub PBAs in the determined set.

Example 31 includes the subject matter of any of Examples 28-30, and further including means for receiving the PBA data from each sub PBA in the determined set, in response to the one or more read requests; and means for merging the received PBA data into the main PBA.

Example 32 includes the subject matter of any of Examples 28-31, and wherein the means for merging the received PBA data into the main PBA comprises means for aligning the received PBA data from a sub PBA to an associated location in the main PBA; and means for combining the aligned PBA data in the main PBA.

Example 33 includes the subject matter of any of Examples 28-32, and wherein the means for combining the aligned PBA data comprises means for performing an OR operation on the received PBA data associated with the sub PBAs.

Example 34 includes the subject matter of any of Examples 28-33, and wherein the means for aligning the received PBA data from the sub PBA comprises means for shifting the PBA data from the sub PBA to an initial location; means for shifting the PBA data as a function of the position of the associated sub PBA in the main PBA; and means for masking unused bits in the PBA data associated with the sub PBA.

Example 35 includes the subject matter of any of Examples 28-34, and wherein the means for masking the unused bits comprises means for setting the unused bits to zero.

Example 36 includes the subject matter of any of Examples 28-35, and wherein the means for receiving a read request comprises means for receiving a read request that includes attribute data indicative of the address in the main PBA, a length indicative of an amount of data to be read, first byte enable data, and last byte enable data; and wherein the means for determining translated attribute data comprises means for determining a translated address, a translated length, translated first byte enable data, and translated last byte enable data.

Example 37 includes the subject matter of any of Examples 28-36, and wherein the means for determining one or more bit addresses comprises means for determining a start bit address and an end bit address.

Example 38 includes the subject matter of any of Examples 28-37, and wherein the means for determining one or more bit addresses comprises means for converting the address from a doubleword address to one or more bit addresses.

Example 39 includes the subject matter of any of Examples 28-38, and wherein the means for comparing the one or more bit addresses comprises means for comparing a start bit address and an end bit address to the addresses of the sub PBAs.

Example 40 includes the subject matter of any of Examples 28-39, and further including means for determining, by the compute device, whether the start bit address and the end bit address cross a quadword boundary; and means for determining, by the compute device and in response to a determination that the start bit address and the end bit address cross a quadword boundary, a set of split addresses.

The invention claimed is:

1. A compute device comprising:
a request manager to receive a request to read pending bit array (PBA) data from a main PBA mapped to multiple sub PBAs, wherein each sub PBA is associated with a different one of a plurality of data storage devices, and the request includes attribute data indicative of an address in the main PBA from which to read the PBA data;
a remap manager to determine one or more bit addresses from the attribute data, compare the one or more bit addresses to addresses of the sub PBAs in the main PBA to determine a set of the sub PBAs to be read, and map the one or more bit addresses to the determined set of sub PBAs to be read.

2. The compute device of claim 1, wherein to map the one or more bit addresses comprises to determine translated attribute data for a read request associated with each sub PBA in the determined set.

3. The compute device of claim 2, wherein the request manager is further to send one or more read requests to the plurality of data storage devices, to read the one or more sub PBAs in the determined set.

4. The compute device of claim 3, wherein the request manager is further to receive the PBA data from each sub PBA in the determined set, in response to the one or more read requests; and
the remap manager is further to merge the received PBA data into the main PBA.

5. The compute device of claim 4, wherein to merge the received PBA data into the main PBA comprises to:
align the received PBA data from a sub PBA to an associated location in the main PBA; and
combine the aligned PBA data in the main PBA.

6. The compute device of claim 5, wherein to combine the aligned PBA data comprises to perform an OR operation on the received PBA data associated with the sub PBAs.

7. The compute device of claim 5, wherein to align the received PBA data from the sub PBA comprises to:
shift the PBA data from the sub PBA to an initial location;
shift the PBA data as a function of the position of the associated sub PBA in the main PBA; and
mask unused bits in the PBA data associated with the sub PBA.

8. The compute device of claim 7, wherein to mask the unused bits comprises to set the unused bits to zero.

9. The compute device of claim 1, wherein to receive a read request comprises to receive a read request that includes attribute data indicative of the address in the main PBA, a length indicative of an amount of data to be read, first byte enable data, and last byte enable data; and
wherein to determine translated attribute data comprises to determine a translated address, a translated length, translated first byte enable data, and translated last byte enable data.

10. The compute device of claim 1, wherein to determine one or more bit addresses comprises to determine a start bit address and an end bit address.

11. The compute device of claim 1, wherein to determine one or more bit addresses comprises to convert the address from a doubleword address to one or more bit addresses.

12. One or more non-transitory machine-readable storage media comprising a plurality of instructions stored thereon that, when executed by a compute device, cause the compute device to:
receive a request to read pending bit array (PBA) data from a main PBA mapped to multiple sub PBAs, wherein each sub PBA is associated with a different one of a plurality of data storage devices, and the request includes attribute data indicative of an address in the main PBA from which to read the PBA data;
determine one or more bit addresses from the attribute data;
compare the one or more bit addresses to addresses of the sub PBAs in the main PBA to determine a set of the sub PBAs to be read; and
map the one or more bit addresses to the determined set of sub PBAs to be read.

13. The one or more non-transitory machine-readable storage media of claim 12, wherein to map the one or more bit addresses comprises to determine translated attribute data for a read request associated with each sub PBA in the determined set.

14. The one or more non-transitory machine-readable storage media of claim 13, wherein the plurality of instructions, when executed, further cause the compute device to send one or more read requests to the plurality of data storage devices, to read the one or more sub PBAs in the determined set.

15. The one or more non-transitory machine-readable storage media of claim 14, wherein the plurality of instructions, when executed, further cause the compute device to:
receive the PBA data from each sub PBA in the determined set, in response to the one or more read requests; and
merge the received PBA data into the main PBA.

16. The one or more non-transitory machine-readable storage media of claim 15, wherein to merge the received PBA data into the main PBA comprises to:
align the received PBA data from a sub PBA to an associated location in the main PBA; and
combine the aligned PBA data in the main PBA.

17. The one or more non-transitory machine-readable storage media of claim 16, wherein to combine the aligned PBA data comprises to perform an OR operation on the received PBA data associated with the sub PBAs.

18. The one or more non-transitory machine-readable storage media of claim 16, wherein to align the received PBA data from the sub PBA comprises to:
shift the PBA data from the sub PBA to an initial location;
shift the PBA data as a function of the position of the associated sub PBA in the main PBA; and
mask unused bits in the PBA data associated with the sub PBA.

19. The one or more non-transitory machine-readable storage media of claim 18, wherein to mask the unused bits comprises to set the unused bits to zero.

20. The one or more non-transitory machine-readable storage media of claim 12, wherein to receive a read request comprises to receive a read request that includes attribute data indicative of the address in the main PBA, a length indicative of an amount of data to be read, first byte enable data, and last byte enable data; and
wherein to determine translated attribute data comprises to determine a translated address, a translated length, translated first byte enable data, and translated last byte enable data.

21. The one or more non-transitory machine-readable storage media of claim 12, wherein to determine one or more bit addresses comprises to determine a start bit address and an end bit address.

22. A method comprising:
receiving, by a compute device, a request to read pending bit array (PBA) data from a main PBA mapped to multiple sub PBAs, wherein each sub PBA is associated with a different one of a plurality of data storage devices, and the request includes attribute data indicative of an address in the main PBA from which to read the PBA data;
determining, by the compute device, one or more bit addresses from the attribute data;
comparing, by the compute device, the one or more bit addresses to addresses of the sub PBAs in the main PBA to determine a set of the sub PBAs to be read; and
mapping, by the compute device, the one or more bit addresses to the determined set of sub PBAs to be read.

23. The method of claim 22, wherein mapping the one or more bit addresses comprises determining translated attribute data for a read request associated with each sub PBA in the determined set.

24. The method of claim 23, further comprising sending, by the compute device, one or more read requests to the plurality of data storage devices, to read the one or more sub PBAs in the determined set.

25. The method of claim 24, further comprising:
receiving, by the compute device, the PBA data from each sub PBA in the determined set, in response to the one or more read requests; and
merging, by the compute device, the received PBA data into the main PBA.

* * * * *